US005204537A

United States Patent [19]

Bennet et al.

[11] Patent Number: 5,204,537

[45] Date of Patent: Apr. 20, 1993

[54] THICKNESS SENSOR COMPRISING A LEAF SPRING MEANS, AND A LIGHT SENSOR

[75] Inventors: Richard I. Bennet, Crewe, England; Guy H. Berthiaume, Charlotte, N.C.; Michael F. Haw, Charlotte, N.C.; Joseph G. Melber, Jr., Charlotte, N.C.; Jimmie Neill, Sherrilles Ford, N.C.

[73] Assignee: Recognition Equipment Incorporated, Irving, Tex.

[21] Appl. No.: 827,279

[22] Filed: Jan. 29, 1992

Related U.S. Application Data

[60] Division of Ser. No. 781,683, Oct. 24, 1991, which is a continuation of Ser. No. 502,338, Mar. 30, 1990, abandoned.

[51] Int. Cl.[5] .............................................. G01N 21/86

[52] U.S. Cl. ................................ 250/560; 250/223 R; 33/501.03; 400/56

[58] Field of Search ................ 250/223 R, 222.2, 560, 250/561; 356/381; 33/501.03, 501.6, 561.02; 400/56

[56] References Cited

U.S. PATENT DOCUMENTS 4,550,252 10/1985 Tee .................................. 250/223 R 4,937,460 6/1990 Duncan et al. ..................... 250/561

*Primary Examiner*—David C. Nelms

*Assistant Examiner*—T. Davenport

*Attorney, Agent, or Firm*—Ross, Howison, Clapp & Korn

[57] ABSTRACT

A typical printing device has a document feeder, a printer, and a document transport mechanism for transporting documents from the document feeder to the printer. In accordance with the invention, there is provided a thickness measurer which measures the thickness of a document prior to the transport of the document to the printer, a controller which receives the thickness information and which provides a gap-adjustment signal, and an adjuster which receives the gap-adjustment signal and adjusts the gap accordingly.

4 Claims, 4 Drawing Sheets

THICKNESS SENSOR COMPRISING A LEAF SPRING MEANS, AND A LIGHT SENSOR

This application is a division of application Ser. No. 07/781,683 filed on Oct. 24, 1991, which is a continuation of application Ser. No. 07/502,338 filed on Mar. 30, 1990, and now abandoned.

This patent relates to the printing of information on individual sheets of paper or documents, and relates more particularly to the optimization of the printing process in response to variations in thickness of successive sheets of paper or documents.

BACKGROUND OF THE INVENTION

It is not easy to print on fast-moving documents such as checks and deposit tickets, especially if they vary in thickness. One commonly used type of printing mechanism passes a document between a print head and a platen or hammer. Such a mechanism depends on a particular spacing or "gap" between the print head and platen or hammer. If the spacing is too small, unwanted debossing of the document (deformation of the document due to pressure from print wheels and the like) may occur. If the spacing is too great, there may be unprinted or faintly printed regions called "voids".

In the type of printer having a hammer which moves relative to a character formation element such as a print wheel, a controlled amount of energy is put into the hammer and this energy is absorbed by the paper and ribbon sandwiched between the hammer face and print wheel. Part of the energy is restored to the hammer by rebounding, as the system is partially elastic. The print quality is thus a function of hammer energy, character face area, and paper/ribbon characteristics. It is known to adjust the hammer energy based on character face area, and to adjust the energy to allow for the (unchanging) thickness of the paper presently loaded to the printer.

In present-day business activities, there is a premium set upon ever-faster printing, and upon ever-increasing numbers of documents processed between voids or other failures. As a result optimal gap adjustment is of increasing importance.

If the paper being printed upon is supplied as a continuous blank or preprinted form, it is often possible to set the gap once and leave it unchanged for the duration of the print run. If the paper being printed upon is in the form of individual sheets, and if the sheets have uniform thickness and other relevant physical characteristics, it is likewise often possible to set the gap once and leave it unchanged for the duration of the print run. However, where the documents to be printed upon vary in thickness from one to the next, a printer that has been set with a particular gap may encounter the above-mentioned embossing and voiding problems.

Several techniques for adjustment of printer gap are known. One known technique, typified in U.S. Pat. Nos. 4,575,267 to Brull and 4,632,577 to Brull et al., is simply to print on the document only after pressing the platen against the print head with a spring-loaded apparatus. Variations in the thickness of the document are taken up by varying distances of compression of the springs. While such an arrangement may accommodate varying document thickness in some printing applications, it has the drawback of requiring that the print head be moved repeatedly some distance away from the document and toward the document, once for each newly presented document.

Another technique, limited in its applicability to certain impact-type printers is taught in U.S. Pat. No. 4,173,927 to Van Kempen et al. The patent describes a printing apparatus having a rotating character drum and a print hammer. A print hammer is caused to accelerate toward the drum at such time as a desired character will be in place for printing. A detector is used to determine how long it takes for the hammer to reach the paper and drum. If this interval, called the "flying time", is deemed to be too long or too short, the drive parameters of the hammer, such as its initial position and driving force, are adjusted. One disadvantage of this apparatus is that when conditions change, at least one (typically poor) print must be made before the system can provide the necessary compensating adjustment.

Yet another known approach to the problem of accommodating changes in thickness of the print medium is exemplified by U.S. Pat. No. 4,088,215 to Bader and U.S. Pat. Nos. 4,174,908 and 4,233,895 to Wehler. In the Bader and Wehler apparatus, for example, the print head is adjustably linked to the platen, and a rider linked to the print head and located in its vicinity follows the print medium. The rider, having a pressure sensor, will yield a nearly constant output if the moving print medium remains constant in thickness. If the print medium becomes thicker or thinner, the output from the pressure sensor changes the changed output, which is constantly compared to a reference level, gives rise to an error signal. The error signal is amplified and drives a servo that adjusts the spacing or gap between print head and platen. The servo drives the gap size in the direction that reduces the error signal to a null level.

Wehler senses pressure on the rider by means of a megnetoresistor forming two legs of a Wheatstone bridge driving a differential amplifier. Bader uses a moving magnet in the proximity of a Hall-effect sensor. In either case, the sensor is quite nearby to the print head. Response to changes in record carrier thickness is quite quick limited only by the response time of the amplifier and motor, a few tens of milliseconds. The system drives to a null value at the amplifier input and output, and discards any information about the absolute thickness of the record carrier.

Still another approach is exemplified by U.S. Pat. No. 4,676,675 to Suzuki et al. Suzuki et al. teaches the use of an elastomeric material to form the active face of a pressure sensor. The sensor may be used to determine whether paper is present or not, and may also be used to determine the print gap size in connection with paper of a given thickness. The apparatus moves the print head and sensor toward the platen until the pressure has built up to a predetermined level, and then stops.

A related approach is seen in U.S. Pat. No. 4,652,153 to Kotsuzumi et al. and Pat. No. 4,812,059 to Masaki. The references each describe a method for setting a print head position in a dot-matrix printer. The print head is moved toward the paper, and thus toward the platen, until it physically contacts the paper and stops. The print head is then moved away from the paper to a predetermined distance. As a result, variations in thickness of the paper are accounted for. This method has the drawback that it requires substantial and discrete print head movements at the time of gap adjustment. The technique does not lend itself to use on a continuous basis for a long paper of varying thickness, nor is it well suited to handle discrete records of differing thickness at high record handling speeds.

The above-described approaches offer numerous drawbacks, and none is quite satisfactory for the high-speed presentation of discrete records. Where discrete records are to be presented at high speeds, one known approach is to employ multiple paper paths. For example, one high-speed paper path may be sorted into four paper paths for printing, each of which need only perform quickly enough to handle its portion of the stream. After the documents have been printed, the four paths are rejoined. Such an approach, though it permits use of slower printers, has many drawbacks. All the documents must be decelerated for the separate slower paper paths, and reaccelerated to rejoin the fast path. The acceleration and deceleration are fraught with jamming risks. Also, there are race conditions associated with the rejoining, aggravated by any variation in document length among the documents.

It would be desirable to have an apparatus capable of handling discrete records at high speeds. It would also be desirable if the apparatus could sense the need to vary the print gap in advance of the need for the variation, rather than sensing changes at the print head when it may be too late to correct for an interval within which there has already been some poor quality printing.

SUMMARY OF THE INVENTION

According to the present invention, an improved printing gap optimizer is provided meeting the abovedescribed needs.

A typical printing device has a document feeder, a printer, and a document transport mechanism for transporting documents from the document feeder to the printer. In accordance with the invention, there is provided a thickness measurer which measures the thickness of a document prior to the transport of the document to the printer, a controller which receives the thickness information and which provides a gap-adjustment signal, and an adjuster which receives the gap-adjustment signal and adjusts the gap accordingly.

The controller preferably includes an improved thickness sensor for discrete documents, an improved zero level shifting circuit which establishes a zero level associated with the absence of a document in the thickness sensor, and an improved print gap adjuster.

BRIEF DESCRIPTION OF THE DRAWINGS

The invention will be shown and described with reference to a drawing, of which

DETAILED DESCRIPTION OF THE PREFERRED EMBODIMENT

Figure 1:
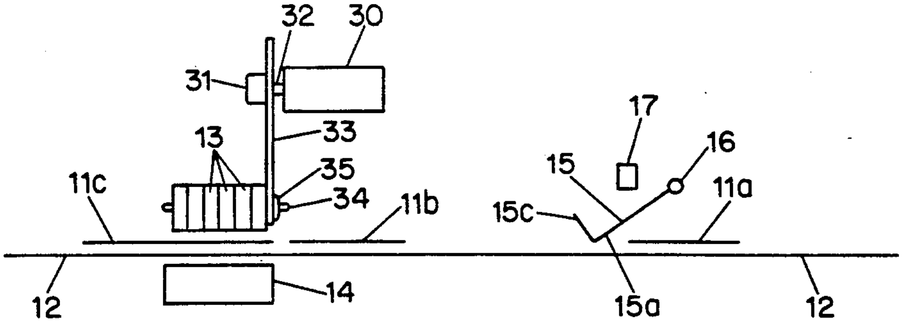
FIG. 1 is a plan view of a printing device in accordance with the invention, including a thickness sensor and a gap adjuster.
Figure 2A:
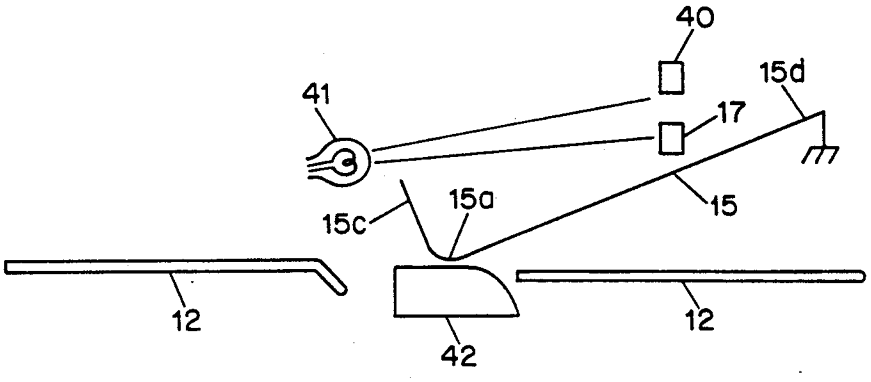
FIG. 2*a* is a plan view of the thickness sensor of FIG. 1.
Figure 2B:
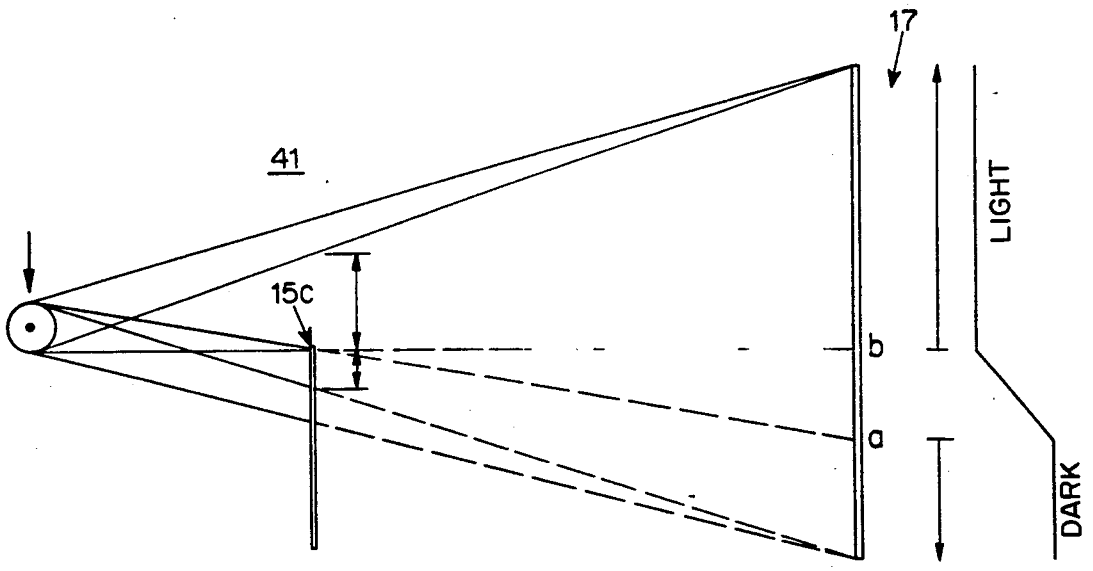
FIG. 2*b* is a side view of the thickness sensor of FIG. 2*a*, showing in greater detail the light source and one of the light sensors.
Figure 2C:
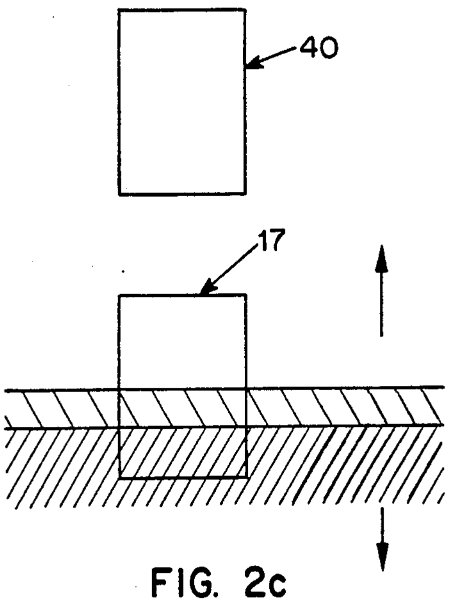
FIGS. 2*c* and 2*d* are views of the light sensors of the thickness sensor of FIG. 2*a*, showing the shadow cast without and with a document in the sensor.
Figure 2D:
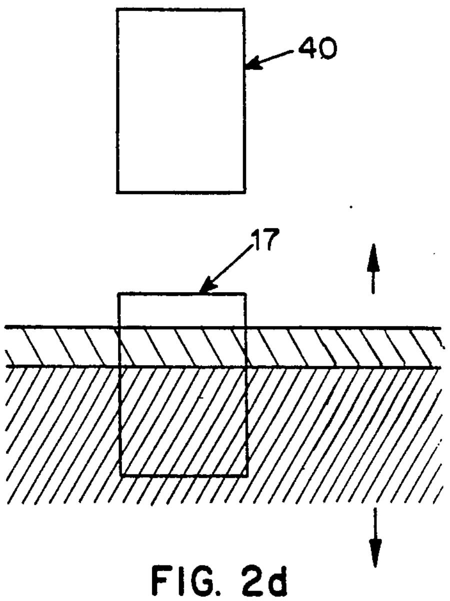

An exemplary embodiment of a printing device according to the invention may be seen in FIG. 1. Documents 11*a*, 11*b*, and 11*c* are seen in edge view in contact with transport surface 12. At the moment depicted, document 11*c* has just received printing, document 11*b* is next in line for printing, and document 11*a* follows document 11*b*. Transport apparatus, not shown in FIG. 1, moves the documents along the transport surface. The transport apparatus may comprise rollers, air cushions, belts, or other known apparatus, and the particular means chosen does not form part of the invention. Associated with the transport apparatus are detectors for sensing the documents and control electronics for tracking documents along the transport apparatus (not shown).

The printing device of FIG. 1, discussed further below, may be the type described in U.S. Pat. No. 4,709,630, issued Dec. 1, 1987 to Wilkins et al. In FIG. 1 the character wheels 13 may be seen, with raised characters arrayed about their periphery. Wheel setting means, not shown in FIG. 1 but described, for example in the above-mentioned Wilkins et al. patent, causes the print wheels to reach desired positions so that desired characters oppose hammer 14. When the wheels 13 are in position, hammer 14 is caused to move upwards and to strike the record 11*c*, with the characters thus formed by impact on the record 11*c*. The hammer 14 is actuated by cam means not shown in FIG. 1.

Record 11*c* was earlier in the position now shown for record 11*a*. Record 11*a* is shown just prior to engagement with a leaf spring 15, rigidly supported at 15*d*, so that a middle region 15*a* is in contact with the track surface, and an end 15*c* lies in the path of a photocell assembly shown partially as photocell 17. A light source not shown in FIG. 1 provides light to photocell 17 along a path obscured to varying degree by leaf spring end 15*c*. When a document 11*a* arrives at the position where the leaf spring contacts the wear block, it causes the leaf spring 15 to rotate or deflect clockwise in relation to the thickness of the document. The deflection of the leaf spring 15 causes the leaf spring 15 to cover the photocell 17 to an extent proportional to the deflection of the leaf spring 15 and the thickness of the record. Thus the photocell 17 output is an analog representation of the document thickness.

In response to the analog signal, an electronic circuit not shown in FIG. 1 selects one of a predetermined number of print gap settings. One skilled in the art will appreciate that with appropriate gap-setting apparatus the gap setting could be continuously adjustable.

The circuit sends stepper-motor drive signals to a stepper motor 30 on the side of the print unit, driving the stepper motor 30 to one of the predetermined positions. A cam 31 on the motor shaft 32 causes lateral motion of a cam block, not shown for clarity in FIG. 1, which itself is restrained from rotating by the rod 33 on which it slides. The lateral movement of the block causes the rod 33 to rotate slightly about its pivot point 34. The rotation causes eccentric support shaft 35 to move wheels 13 slightly closer to or further from surface 12 and hammer 14, thereby changing the print gap.

Turning now to FIG. *2a*, what is shown is the thickness sensor in more detail. Transport surface 12 is shown, and in the figure a document moves from right to left.

In an inter-document period, with no document being measured, the leaf spring 15 is lightly loaded against the wear block 42 to assure contact between the two. The mounting angle of the leaf spring 15 relative to the transport surface and wear block 42 allows the documents to pass under the leaf spring 15 without impeding their progress. End 15*c* of the leaf spring is at or near the light path from lamp 41 to photosensors 17 and 40.

When a document moves into the thickness sensor, leaf spring 15 is caused to deflect upward slightly. The document is "calipered", or pinched, between contact area 15*a* and wear block 42. End 15*c* moves upward and casts a larger shadow on photosensor 17. The dimensions of the above-mentioned components are selected so that when the thickest expected document is in the thickness sensor, the shadow of the end 15*c* casts a larger shadow on photosensor 17 but casts no shadow on photosensor 40. This permits photosensor 40 to serve as a reference signal for the thickness signal from the photosensor 17. As will be seen below, this establishment of a reference signal helps correct for variations in the brightness of the lamp 41 and for variations in dust levels in and about the light path.

As shown in FIG. *2b*, in the ideal case the light source 41 would be a line or point of light. In practical terms the light source has some extension in two dimensions, and so casts a fuzzy shadow. The fuzzy edge of the shadow need not, however, cause nonlineararity if the method of the invention is employed. The size of the light source, the range of thickness being measured, allowances for wear, and the size of the light sensor 17 are all selected to establish the side view shown in FIG. *2b*, shown in during a time when no document is in the thickness sensor. As shown in FIG. *2b*, every part of the shadow falls on the sensor 17, extending from point a to point b on the sensor 17. Point a is selected to be some distance from the bottom edge of sensor 17, to permit some wear. Point b is selected to be far enough from the top of sensor 17 to allow a full range for thickness measurement.

The bottom of sensor 17 is totally shadowed and the top is totally illuminated. From a to b on the sensor the light intensity goes from totally dark to totally unshadowed.

As the leaf spring 15 is deflected upward by a document, the shadow moves upward on the sensor 17. The geometry of the thickness sensor is selected so that with the thickest document, the upper part of the sensor 17 is nontheless fully illuminated.

FIGS. *2c* and *2d* show the illumination on the face of the sensors 17 and 40 in the inter-document state and when a document is being measured. The reference sensor 40 is never shadowed by the leaf spring 15.

As will be seen from FIGS. *2b* and *2c*, the output from sensor 17 can be quite linear with respect to the position leaf spring 15, so long as the (potentially very nonlinear) transition region is always entirely on the face of the sensor 17, and does not spill over the top or bottom edge of the sensor 17.

Among the beneficial features of the thickness sensor over known prior art sensors are the following. The moving member, in this case the leaf spring 15, is light in weight as compared with prior art rollers. A large mass would need high spring force to damp out (e.g. settle) transients. High forces, however, have the drawback of marking the paper, smearing print, or causing jams. To permit high document processing speed, a high natural frequency is required for the system and this, together with the constraint of low force, dictates the light leaf spring mass. The sensitivity of the thickness sensor stems in large part from the multiplier provided by the light path. The distance from the lamp to the end 15*c* is preferably but one-fourth the distance from the lamp to the photosensor 17. This provides a four-to-one multiplicative advantage, which in conventional sensors would be accomplished by physical multipliers. But multipliers would add mass to that which must be displaced by the leading edge of the document, causing undesirable overshoot as the leading edge arrives. In the thickness sensor of the invention, the multiplier is a massless light beam.

Transport surface 12 is subject to vibration. As a consequence, the leaf spring 15, lamp 41, and sensors 17 and 40 are all mounted rigidly together, and that assembly is rigidly mounted to the wear block 42, so that vibration in the transport surface has only minimal affect on the thickness measurements.

Figure 3:
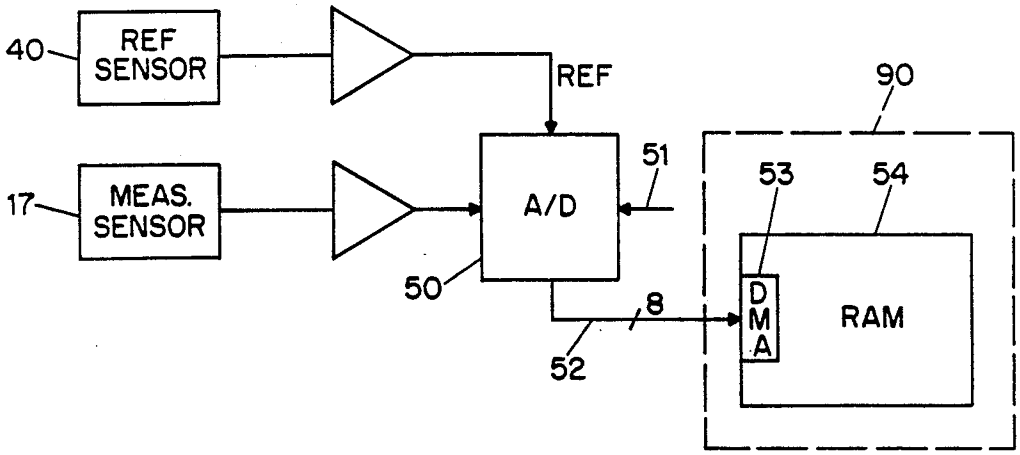
FIG. 3 is a functional block diagram of the signal path from the thickness sensor to the processor direct memory access of the printing device.

FIG. 3 shows in functional block diagram form the signal path from the photosensors 17 and 40. Each photosensor produces an electric current proportional to the incident light, and the current is amplified and converted to a voltage level signal. The reference sensor 40 provides a reference voltage for analog-to-digital (A/D) convertor 50, while the measurement sensor 17 provides the thickness signal level to the measurement input of the A/D convertor 50. When a strobe signal 51 is applied, the A/D convertor provides a parallel word, preferably eight bits wide, via data path 52 to RAM 54 of processor 90 by way of DMA circuit 53.

Figure 4:
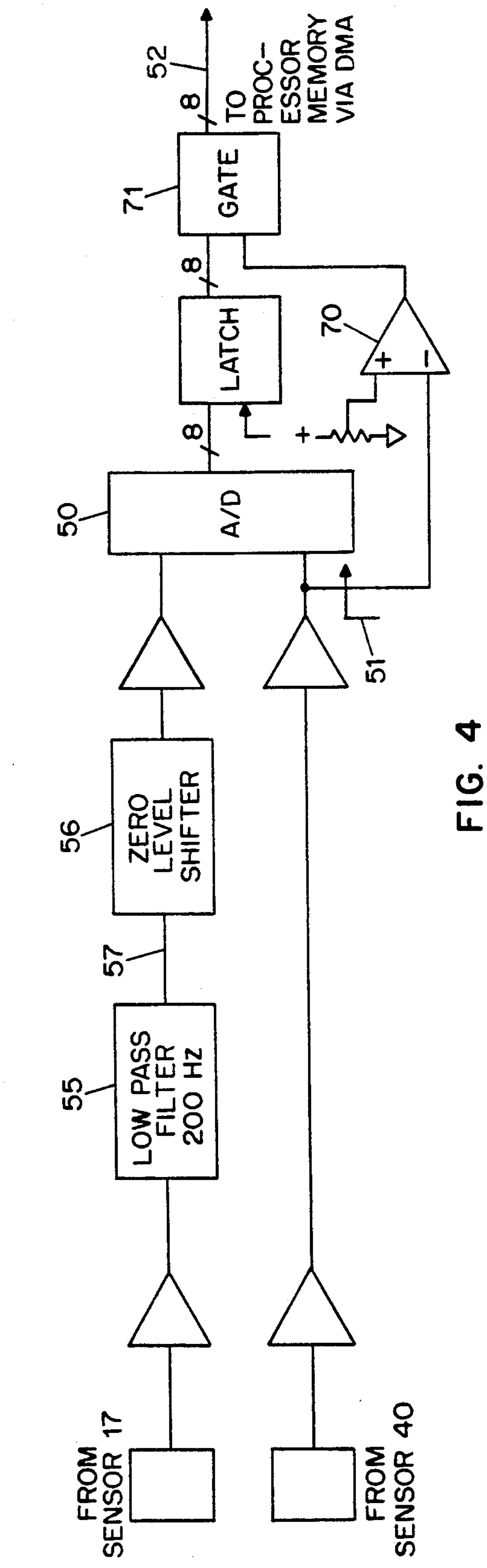
FIG. 4 is a more detailed functional block diagram of the signal path of FIG. 3, including a zero level shifter 56.

FIG. 4 shows the signal path of FIG. 3 in greater detail. The signal path from photosensor 17 includes a sharp 200-Hz lowpass filter 55, preferably a Bessel filter. The 200 Hertz cutoff was selected to be below the natural frequency of the tip of the leaf spring 15 and a Bessel filter was selected for its small delay and minimal overshoot on step function inputs. The analog signal, low frequency after the filter 55, is processed by zero level shifter 56. Zero level shifter 56 is provided because the DC level at line 57 associated with zero thickness (i.e. no document in the thickness sensor) may drift with time and with equipment life. Examples of factors that may cause a shift in the DC level at line 57 relative to zero thickness are lamp degradation, dust accumulation, aging and/or deformation of leaf spring 15, wear in the leaf spring 15 and wear plate 42, and drifts in the data path between the sensor 17 and the line 57.

The design of the printing apparatus is such that there is a minimum interdocument gap (typically two inches). At typical document transport speeds this corresponds to an interdocument time of several few milliseconds. The arrival of a document in the thickness sensor lifts leaf spring 15, reducing the signal from sensor 17. The reduced signal persists for as long as the document is in the thickness sensor, typically tens of milliseconds.

The level shifter 56 is shown in schematic form in FIG. *5a*. DC signal level at line 57 enters at the left of the figure, passes through resistor 60 and capacitor 61, to the inverting input of amplifier 63 through input resistor 62. Amplifier 63 is preferably an operational amplifier, but can also be a comparator. The noninverting input of amplifier 63 is at signal-ground level.

A negative-going change in the signal at line 57 pulls down the inverting input of the amplifier 63, and the output of the amplifier 63 is large positive. Diode 65 conducts and capacitor 61 is charged with a time constant defined by the capacitance of capacitor 61 and by the summed resistances 60 and 64. As the time constant is small (preferably a few tens of microseconds) the response of the circuit is relatively instant-the output at line 58 is set to zero, regardless of the final value reached by the negative-going input. The time constant, then, is small in comparison to the inter-document time. The output at line 58 is clamped to zero volts and capacitor 61 is charged to the negative input voltage.

A positive-going change in the signal at line 57 pulls up the inverting input of the amplifier 63, and the output of the amplifier 63 is large negative. Diode 65 is reverse-biased and does not conduct. Capacitor 61 is discharged with a time constant defined by the capacitance of capacitor 61 and by the summed resistances 60 and 66. As the time constant is large (preferably ten seconds) the output of the circuit simply tracks the input, increasing from zero. Capacitor 61, then, is charged to the positive input voltage with a time constant that is very large in comparison to the time that the document is under the sensor. This results in the output at line 58 tracking the positive input signal.

Figure 5B:
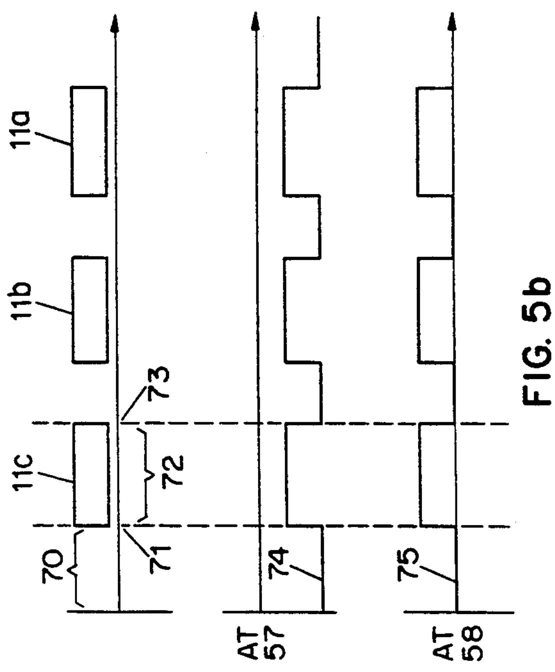
FIG. 5*b* shows signal levels illustrative of the function of zero level shifter 56.
Figure 5A:
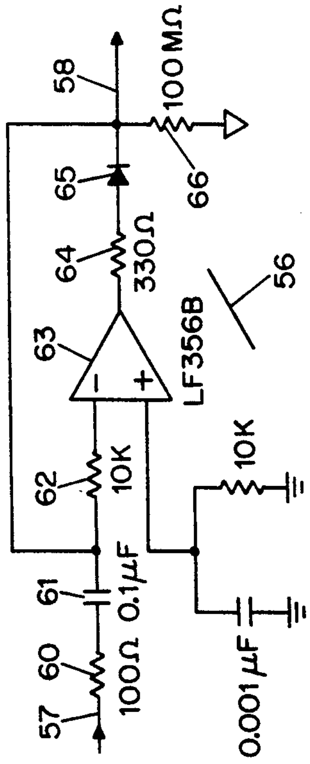
FIG. 5*a* is a schematic diagram of zero level shifter 56.

FIG. 5*b* shows in timeline form the relationship between document movements and signal levels at the input and output of the zero level shifter. During inter-document periods 70, the signal level at line 57 will have dropped to a mean negative value 74. Zero level shifter 56 accommodates this by charging capacitor 61 as necessary to arrive at a zero level at the output of line 58, shown at 75.

The arrival of a document 11*c* at the thickness sensor at time 71 blocks some light previously incident on photosensor 17, causing a rise in the signal at line 57. The positive-going signal at line 57 is tracked through to the output at line 58.

At time 73, the leaf spring 15 drops back to the wear plate 42, and the light level at photosensor 17 again reaches its maximum. The resulting drop in the signal at line 57 prompts the zero level shifter 56 to charge the capacitor 61 back to the negative input valve, so that the output at line 58 is at zero volts.

As shown in the bottom trace of FIG. 5*b*, the output is positive when a document is in the thickness sensor, and the amplitude is indicative of the document thickness.

It is advantageous to sense degradation in thickness sensor response in advance of the time the degradation affects actual performance. This permits preventative maintenance to be performed prior to serious problems. It is also advantageous to make it known to the processor of the printing apparatus when, say the lamp 41 has dimmed unduly or has burned out. For these reasons, provision has been made to sense lamp degradation, as shown in FIG. 4. The reference signal level from reference photosensor 40 is provided not only to A/D converter 50 but also to comparator 70. Comparator 70 continuously compares the reference signal level to a predetermined threshold level, preferably about one-half the nominal reference level. If the reference level drops below the threshold, the output of comparator 70 drives gate 71 to a predetermined logic level, preferably either all binary 1's or all binary 0's. The processor, not shown in FIG. 4, is programmed to respond to this predetermined logic level appropriately, such as by assuming a default document thickness and providing an error message for the operator of the printing apparatus.

As mentioned above in connection with FIG. 3, the strobe 51 applied to A/D convertor 50 starts a loading of an 8-bit byte into the RAM 54 through DMA apparatus 53 in response to signals from the document sensing and control electronics. In a preferred embodiment, the system does not take just a single thickness reading. Instead, many dozens of readings are taken and loaded into successive locations in the RAM 54. The processor 90 of the printing apparatus reads out the thickness readings. It has been found that reliable conclusions about the actual document thickness may be reached by compiling a histogram, showing how frequently each thickness value was reported. The modal (most frequently occurring) value is found, and the processor considers each thickness finding that is less than the modal value until the thickness drops away quickly; the thickness value prior to the dropoff is taken to be the "true" document thickness.

The use of a histogram provides a highly reliable means for determining thickness. For example, a particular document gave the same thickness value when new and after being crumpled and then straightened.

The histogram usage will now be discussed in more detail. The algorithm is broken up into three main sections—data collection, data analysis, and data translation.

The data collection phase, which is the first phase of document thickness detection, involves taking many thickness samples as the document moves along the transport. The thickness data, as described above, is preferably collected using DMA transfers timed from a clock source that is preferably synchronized to the transport motion, although other clock sources could be used and it is not an absolute requirement that the collection be via DMA. For example, the thickness data could be collected by the processor itself under program control, prompted by program timing or by periodic interrupts.

A lower bound on the number of samples is given by the requirement that enough samples must be taken of the document thickness that a statistical representation of the thickness can be made.

Data collection begins before the document lead edge displaces the thickness detector spring. This allows for the above-mentioned zero thickness reference measurement. Measurement of the zero reference permits determination that there is no scrap of paper remaining under the spring from the previous document, and that the above-mentioned zero level shifter circuit is functioning.

Another data collection is made after the document trailing edge passes under the detector in order to determine if a scrap of paper was left under the detector spring by the current document.

The second phase of document thickness detection, namely data analysis, includes a zero reference calculation and a displacement calculation. The zero reference calculation is made by averaging the first samples taken of the document, which as mentioned above are collected before the document arrives at the detector spring. The resulting average is used as the zero average for the current document. This value will generally be very close to zero, due to the action of the zero level shifter circuit.

If the resulting average is above some critical value, say 10, then the great likelihood is that a scrap of paper became detached from the previous document and remained under the spring. In such a case, of course, the resulting average is not valid as a zero thickness reference, and preferably the zero reference is generated by taking the average of the last four valid zero reference values. The result is used as the zero reference for the current document. (At power on, the last four valid references are initialized to zero.)

Due to variances in the thickness of the document, and to vibration in the document transport, thickness samples taken from a particular document will not be the same along its length. Experience suggests the values will vary as much as 5 to 10 percent of the full-scale value. Among the aggravating factors can be folds in a document, foreign substances on a document, and crumpling and straightening of a document. For all these reasons a simple average of the displacement values will lead to inaccurate results as to the actual document thickness.

In a preferred embodiment, the thickness displacement measurement is done by creating the above-mentioned histogram of the collected thickness values. If enough samples are taken (preferably about 100), then one displacement value will emerge as the modal (most frequently occurring value, also called "peak" value). One approach to thickness measurement would be to take this peak value (less the zero reference value) as the thickness. According to the invention, however, another approach is taken. Thickness values successively smaller than the peak value are considered, to see how often they arose in comparison to the frequency of occurrence of the peak value. When a thickness value is found that arose less than one-fourth as often as the peak thickness value, this so-called "25-percent" value is taken to be representative of the document thickness. The zero reference value is subtracted, yielding the thickness displacement value for the current document.

The third phase of document thickness detection, namely data translation, is then performed. The thickness displacement value is used as an index into a lockup table. The values stored in the table will include codes for "too thin" and "too thick" in addition to codes representative of the plurality of discrete gap settings settable at the gap setting means.

The gap setting code is not simply loaded into the gap setting means. Instead, the gap setting code in saved into a data area associated with the serially numbered document as described below. When that document later approaches the printer, then the print gap adjustment means is set according to the gap setting code for that document.

It will be noted that an error can arise if a scrap of paper is left under the thickness detector spring by the last document for a given production run. In this event, after typically ten seconds, the zero level shifter circuit will have re-zeroed the thickness sensor, making the next document reading (i.e. the first document from the next production run) invalid. Preferably this error is tested for by taking a thickness sample shortly after the trailing edge of the last document has passed the thickness sensor. If this reading is above some critical value, then a message is preferably displayed instructing the operator to clear the thickness sensor spring of debris.

In the preferred embodiment, the processor uses the histogram-derived thickness value as a pointer into a table of gap settings. As will be appreciated by those skilled in the art, any nonlinearities along the data and control path may be accounted for in the table of gap settings. It is interesting to note that it may be optimal to assign certain table values in what is intentionally nonlinear fashion. For example, empirical study shows that thicker documents tend to require more compression between the hammer face and the print wheels than thinner documents.

Each document entering the printing device according to the invention has been assigned a serial number by the tracking and control logic. In an exemplary embodiment, the total number of documents in motion through the system is well under a hundred, so values from 0 to 255 are used to distinguish the documents. The gap setting found to be appropriate for the document just measured in the thickness sensor is stored by the processor in a preselected portion of RAM 54 along with the serial number for that document. Later, when the document approaches the print mechanism, the gap setting data and the data to be printed on the document is retrieved from RAM 54 and provided to the gap setting mechanism and wheel setting mechanisms. The gap and wheels get set, and the document is printed in a way that is optimized for its thickness.

Figure 6:
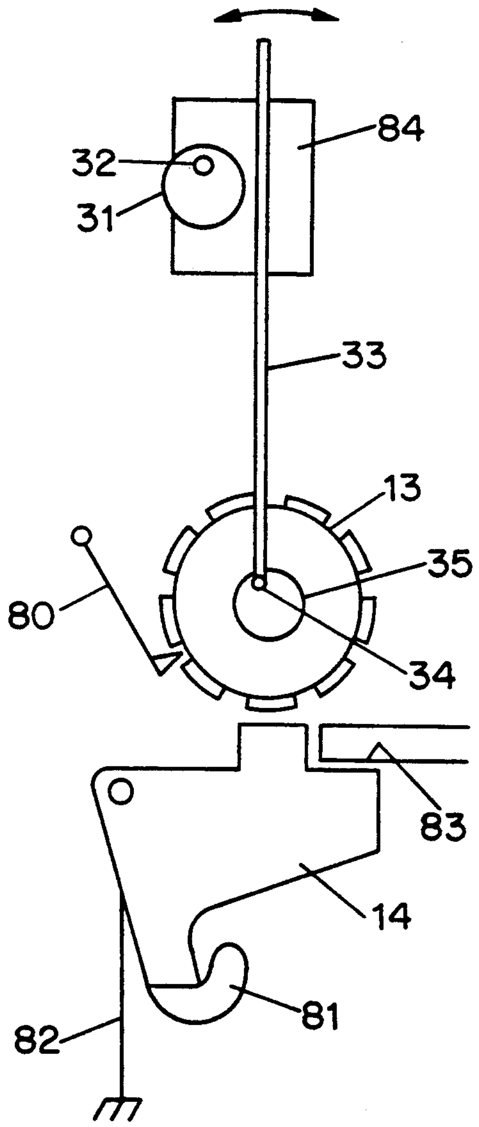
FIG. 6 shows in side view the mechanism of FIG. 1.

The gap adjustment mechanism will now be discussed in greater detail with reference to FIG. 6, which shows a section of the print mechanism viewed in the direction of the paper path. In the view of FIG. 6, a document moves directly toward the viewer. Prior to arrival of the document at the print mechanism, the wheels 13 will have been moved into position by mechanisms not shown in FIG. 6, but which may be mechanisms as disclosed in the above-mentioned Wilkins et al. Pat. No. 4,709,630.

When the wheels are expected to have been correctly set, an aligner bar 80 is moved counterclockwise into a space between character faces in wheels 13. Sensors, not shown, associated with the aligner bar 80 detect the failure mode that occurs if one or more of the wheels fails to reach a correct position so that the aligner bar 80 is not able to move fully into place. The point of engagement between the aligner bar 80 and the wheels 13 is at 45 degrees from the position of the print hammer 14.

If the aligner bar 80 moves fully into place, then the print mechanism awaits the proper positioning of the document between the wheels 13 and the hammer 14. When the document is in place, the snail cam 81, which had earlier rotated counterclockwise to pull the hammer 14 down and against spring 82, rotates further counterclockwise to release the hammer 14. Hammer 14 impacts with the document (not shown in FIG. 6) and thus indirectly with an inked ribbon (not shown in FIG. 6) and thereby with the character faces of the wheels 13.

As will be appreciated, in a printing device handling typically eight documents per second, the document velocity is such that the release of the hammer 14 must be precisely controlled. U.S. Pat. No. 4,552,065 to Billington et al. teaches a technique for striking the hammer 14 at the correct time.

The upward motion of a hammer might, in known prior printer designs, have been dissipated in the paper, the ribbon, and the character face. This has numerous drawbacks, not the least of which is the often permanent deformation of the document contours, called "debossing". If the printed character is, for example, a MICR (magnetic ink) character such as is used at the bottom of a check, then deformation of the check surface is likely to degrade later MICR reading reliability. Even a small gap between the MICR read head and the ink of the character, for example, can inhibit successful reading.

In the printer according to the invention, the hammer 14 when released by snail cam 81 strikes a stop 83 and rebounds. The dwell time at the stop is quite brief, estimated at a few tens of microseconds. The gap between the hammer 14 and the print wheels 13 is preferably controlled to be such that the hammer 14, in the absence of the document and ink ribbon, does not touch the wheels 13. Only with the document and ink ribbon in place is there pressure conveyed by the hammer 14 to the wheels 13, and then only through the document and the ink ribbon.

As was discussed above, in some prior art printers it is known to adjust the hammer energy based on factors including the (unchanging) thickness of the paper presently loaded to the printer. In the printer according to the invention, the hammer is driven with a high amount of energy, and the majority of this energy is returned as hammer rebound based on the elastic collision of the hammer 14 and the stop 83. The amount of energy absorbed on the print cycle is a function of the character face area, the print gap (i.e. the distance from the print wheels to the hammer face at the time of impact) and the paper/ribbon characteristics. In the printer according to the invention, the print quality is directly controlled by adjusting that gap.

Experience shows that optimal spacing between the print wheels and the hammer face at the time of impact (that is, the optimal print gap) is not linear with document thickness. Rather, the impact energy per unit area on the paper/ribbon interface is to be optimized, and the impact energy is influenced by the extent to which the paper is capable of being compressed. Thicker paper tends to compress more than thin paper, requiring more pressure if a desired character face force is to be achieved.

If too much character face force (per unit area) is applied, the paper is permanently debossed (deformed), while if too little is applied the printing will have voids.

The differing compressibility of thick and thin papers makes some thickness measurement methods better than others. Experience suggests that the lightly loaded "caliper" thickness sensor of the invention is ideal. A "soft" sheet of a given thickness will measure out as thinner than a "hard" sheet of that thickness. Correspondingly, a "soft" sheet will require more compression during printing to establish a desired character face force than a "hard" sheet of the same thickness.

In prior art printers used with discrete documents, it is commonplace to set up the transport surface 12 in such a way that the document is brought to a complete stop for printing. That is to say, each document is brought up to speed, moved to the printer, brought to a stop, printed upon, and again brought up to speed. While the stopping of the document makes things easier for the designer of the printer, it adds to the mechanical complexity of the document transport mechanism and increases the opportunities for document jams.

For all these reasons, it is desired to be able to print "on the fly", that is, under circumstances of virtually uninterrupted document movement even during printing. For printing to be done "on the fly", the hammer dwell time on the document must be quite short. But, as described above, the gap must also be closely controlled, which is easy if the documents are known to be of uniform thickness but has heretofore been difficult to achieve if the documents are of varying thickness.

According to the invention, when a document has just received printing by means of the hammer 14, the processor can retrieve the gap-setting data and wheel-setting data associated with the next document. The gap-setting data is applied to motor 30, shown in FIG. 1. In the view of FIG. 6, the setting of the motor 30 causes rotation of cam 31 on shaft 32. Cam 31 urges cam block 84 to follow, moving rod 33 to the left or the right in FIG. 6. Rod 33 pivots on pivot point 34, which causes eccentric shaft 35 to move the wheels 13.

The linkage is such that movement of rod 33 to the right (clockwise) moves the center of shaft 35 downwards and to the left. The direction of movement of the center of shaft 35, and thus of the wheels 13, was so chosen so that the wheels would seat correctly with aligner bar 80 regardless of the movement of rod 33.

Movement of rod 33 to the right reduces the gap between wheels 13 and hammer 14, and movement of rod 33 to the left increases the gap between wheels 13 and hammer 14.

Motor 30 is preferably a stepper motor, though a DC motor could also be used with an appropriate feedback loop.

It will be appreciated by those skilled in the art that while the above embodiment of the invention shows adjustment of a gap between a hammer and a character formation means, the teaching of the invention can be employed to accommodate varying document thickness with other printing technologies, such as drum printers, dot-matrix printers, electrostatic printers, and thermal printers.

Check encoding

The invention is of particular utility in the field of check encoding. When first received by the checking account customer, the checks are preprinted with the customer name, bank name, check number, and the like. Bank routing numbers and the customer account number are printed with magnetic ink across a specified area at the lower edge of the check.

After the account holder writes the check and gives it to the payee, the payee or the payee's bank will print ("encode") the dollar amount of the check in the lower right corner of the check, also in magnetic ink. As will be appreciated by those skilled in the art, the checks to be encoded are of many different thicknesses. Yet prior art check encoding machines have typically done nothing to accommodate the varying thicknesses.

The large volumes of checks to be encoded and the high internal cost associated with unsuccessful encoding each contribute to the importance of speed and reliability of an encoding apparatus. Any increase in throughput is valuable only if the increase does not adversely affect the quality of the printing, for example. When the invention is applied to check encoding, it becomes possible to print "on the fly" on checks as they pass through the printer, and this permits a substantial increase in throughput with improved print quality. For example, while known check encoders typically handle only 3 documents per second, with the invention, encoder throughput can reach 8 documents per second.

We claim:

1. A thickness sensor for sensing thickness of a series of documents moved sequentially therethrough, comprising:

a leaf spring having first and second ends;

a wear plate disposed adjacent said leaf spring;

said leaf spring being biased toward said wear plate, such that said first end of said leaf spring is deflected in response to documents moving between said leaf spring and said wear plate;

a light source disposed adjacent said first end of said leaf spring; and a light sensor for detecting light generated by said light source and being positioned with respect to said light source to define a light path disposed between said light source and said light sensor, said light sensor being responsive to changes in the amount of light impinging upon said light sensor due to deflection of said first end of said leaf spring into said light path resulting in a reduction in the amount of light impinging upon said light sensor based upon the thickness of documents moving between said leaf spring and said wear plate.

2. A thickness sensor for sensing thickness of a series of documents moved sequentially therethrough, comprising:

a leaf spring having first and second ends;

a wear plate disposed adjacent said leaf spring;

said leaf spring being biased toward said wear plate, such that said first end of said leaf spring is deflected in response to documents moving between said leaf spring and said wear plate;

a light source disposed adjacent said first end of said leaf spring;

a first light sensor for detecting light generated by said light source and being positioned with respect to said light source to define a first light path disposed between said light source and said first light sensor, said first light sensor being responsive to changes in the amount of light impinging upon said first light sensor due to deflection of said first end of said leaf spring into said first light path resulting in a reduction in the amount of light impinging upon said first light sensor based upon the thickness of documents moving between said leaf spring and said wear plate; and a second light sensor for detecting light generated by said light source and being positioned with respect to said light source to define a second light path disposed between said light source and said second light sensor, said second light sensor being responsive to changes in the amount of light generated by said light source.

3. The thickness sensor of claim 2 wherein said first light sensor generates a first analog signal and said second light sensor generates a second analog signal;

first means responsive to changes in a first direction in said first analog signal for producing a zero-level output;

second means responsive to changes in the other direction in said first analog signal for producing an output that tracks said first analog signal output; and an analog-to-digital convertor, said output of said zero-level output means providing an input to said analog-to-digital convertor and said second analog signal providing a reference input to said analog-to-digital convertor, said analog-to-digital convertor generating a digital data value indicative of document thickness.

4. The thickness sensor of claim 3 and further including:

failure-detection means responsive to a reduction in said second analog signal below a predetermined threshold for driving said digital data value to a preselected value indicative of a failure of said light source.

* * * * *